G. ESTERLY.
Header Attachment to Harvesters.
No. 37,392.
2 Sheets—Sheet 1.
Patented Jan'y 13, 1863.
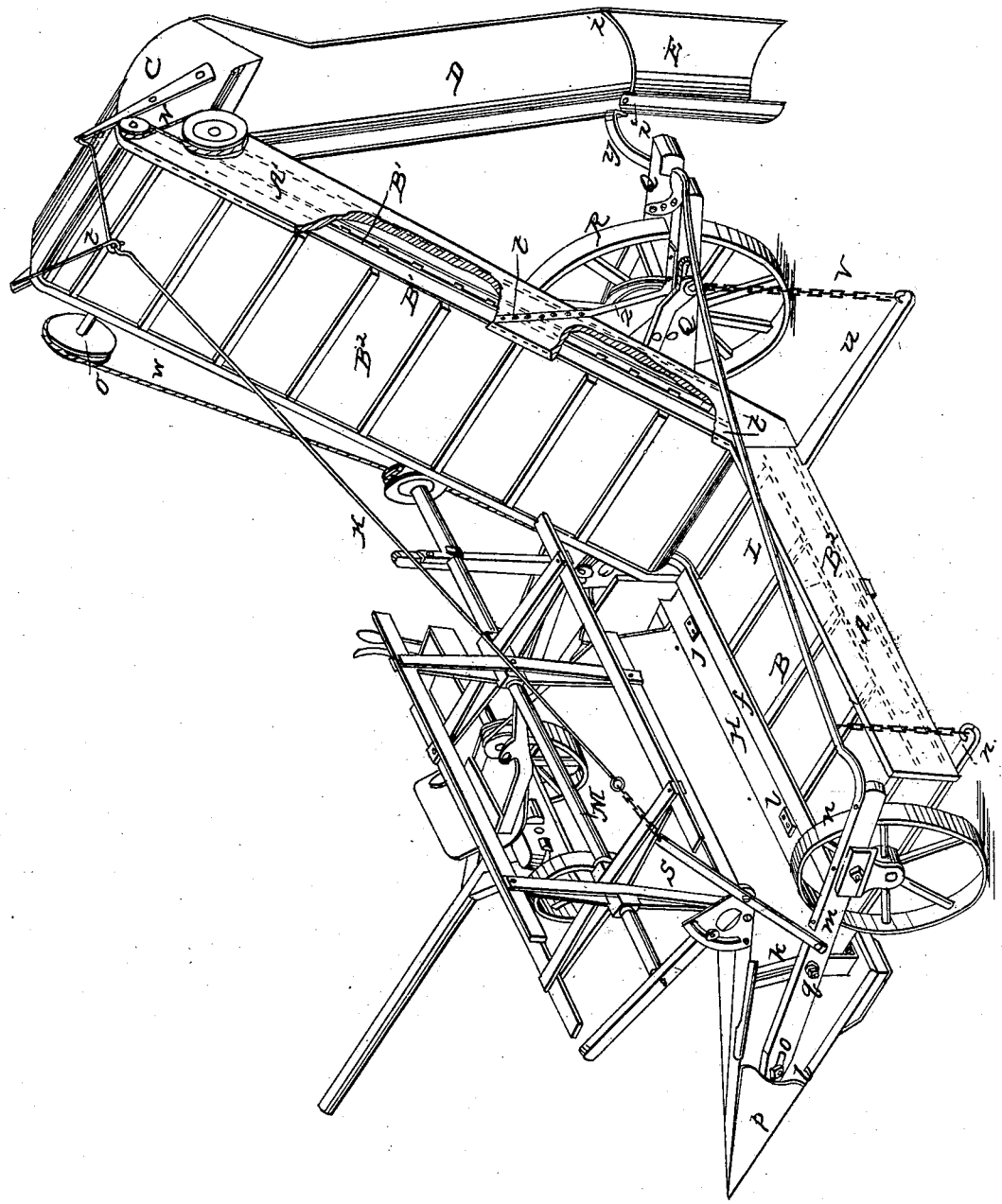

G. ESTERLY.
Header Attachment to Harvesters.
No. 37,392.
2 Sheets—Sheet 2.
Patented Jan'y 13, 1863.
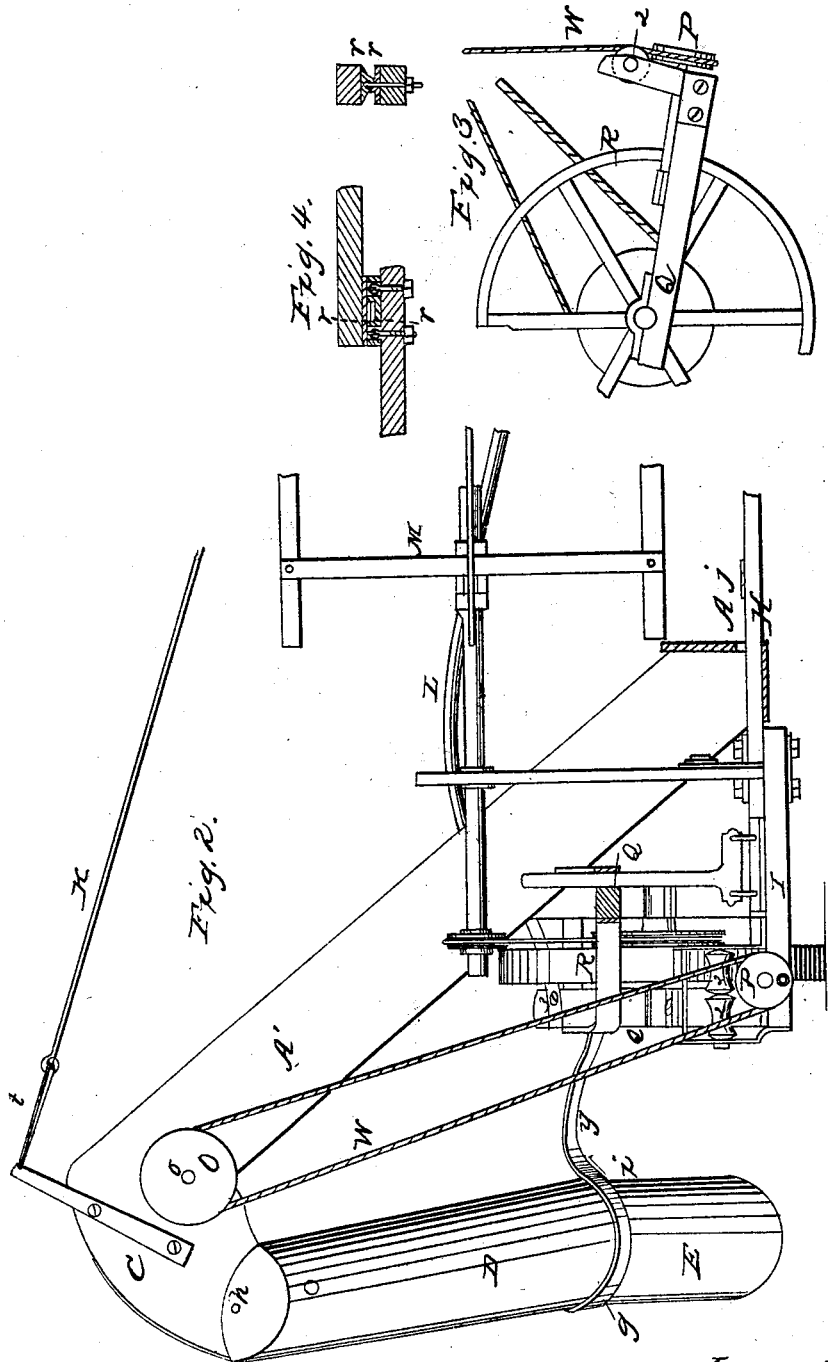

UNITED STATES PATENT OFFICE.

GEORGE ESTERLY, OF WHITEWATER, WISCONSIN.

IMPROVEMENT IN HEADER ATTACHMENTS TO HARVESTING-MACHINES.

Specification forming part of Letters Patent No. 37,392, dated January 13, 1863.

*To all whom it may concern:*

Be it known that I, GEORGE ESTERLY, of Whitewater, in the county of Walworth and State of Wisconsin, have invented a new and useful Header Attachment for Reaper and Mowing Machines; and I do hereby declare that the following is a full, clear, and exact description of the same, reference being had to the accompanying drawings, forming part of this specification, in which—

Figure 1 is a perspective view of my invention applied to the drive-wheel frame of a reaper which has the driver's seat forward of the short supporting-sill of the finger-beam. The view is taken from the rear grain-side corner of the header attachment. Fig. 2 is a front view and partial section of a portion of the whole machine as arranged for heading or cutting grain below the heads. Fig. 3 is a side view of a portion of the main frame of the reaper to which the header is attached. Fig. 4 shows the joint between the short sill and finger-bar.

Similar letters of reference in the several figures indicate corresponding parts.

The leading idea with me in devising the header attachment herein referred to was to provide a device which might be sold along with my combined reaper and mower, for which, at an even date with this application, I have applied for Letters Patent, and when thus sold might be used on the same main or drive-wheel frame, and in connection with the same draft-frame and draft-chain regulator and adjuster thereto attached, such applicability of the header to the main portion of the reaper greatly reducing the expense to be incurred by a farmer who desires to possess on his farm machinery capable of reaping and mowing, and also of heading, as his judgment may dictate or his wants require. To this end, then, I have devised the following-described detached header, and provided on the reaper and mower frame and its connections certain auxiliary devices not necessary while reaping or mowing, but essential while heading.

A A' is an angular spout open at top, but closed in at bottom and sides, except at that part which is adjoined to the finger-bar. The bottom of this spout is flat, and the sides perpendicular thereto. The part A of the spout runs horizontally, the part A' upward and outward from A, so as to form an incline plane. Just above the bottom of the horizontal part A and out of contact with the bottom of the inclined part A' of the spout, a slatted closed canvas apron, B B', is arranged within the spout upon pulley-shafts $a$ $b$, so as to form an angle corresponding with the angle formed by the two parts of the spout. From the angle of the apron B B' to its upper pulley-shaft, $b$, and a slight distance beyond, a second endless slatted closed apron, B², runs, said apron being arranged just out in relief from the part B' of the first apron upon pulley-shafts $d$ $e$, as represented. The first apron is kept down at the part which comes opposite the finger-beam H by means of a guide-cleat, $f$, and at its opposite edge, near the angle it forms, is kept down by a similar but shorter cleat, $g$.

On the upper end of the part A' of the spout a curved chute or discharge-nozzle, C, of flaring form, is constructed, so as to give the grain in its escape from the spout a vertical downward direction in a cart or other receptacle. There is also jointed or pivoted to the lower end of this director C a jointed conductor, D E, so that if the grain is not in a proper condition to be immediately sacked, it may be disposited on the drive-wheel side of the machine, or upon the stubble, out of the track of the machine and the horses. This conductor is flared at its upper end, so as to underhang the chute C, and is attached to the chute by a pivot, $h$, so as to swivel laterally. It also has a joint near its lower end, as indicated at $i$ $i$, so that said lower jointed end, E, may be deflected by the weight of the descending bulk of grain out of a direct line with the upper portion, D, and held down with sufficient force to cause the stubble of the field to be leaned over all in one direction, and thus form a nearly flat bed for the descending grain to deposit upon. The grain is thus deposited in swaths, and can be raked cleaner and easier than if the stubble of the field stood erect. This conductor is very essential in "green-cut" grain, but is removed when the grain is "dry cut," and is to be carried off directly in a wagon, the wagon being drawn along under the discharge-shute C, and the grain falling from the shute into it.

On the front edge of the horizontal part of the spout A A' hinges $j$ $j$ are attached, so that a finger-beam, H, may be hinged to it, as shown. The finger-beam used in this case is longer than the finger-beam for a reaper and mower; hence I provide a finger-beam and cutting apparatus especially adapted for heading. The finger-beam and cutting apparatus are in construction and in their mode of attachment to the sill of the reaper, and to the grain-shoe and divider, and to the beam of the grain-wheel, substantially the same as in the case of the reaper, except as to length, and in being attached on top of the sill, so as to bring them to the proper height, instead of underneath the sill.

The connection between the sill I and the finger-beam H should be a loose one, and be formed by eye-screw bolts and staples used in connection with tongued and grooved plates $r\ r'$, as illustrated in Fig. 4; and in order to employ such a connection, I provide, as in the case of the reaping-machine, a curved slotted standard, $k$, on the outer end of the finger-bar, and connect the grain-divider shoe $l$ and the finger-bar H to the beam $m$ of the grain-wheel $n$ by means of a slot and bolt, $o\ p$, and a clamp-screw, $q$, all as represented. By this means the cutting apparatus can be adjusted to a horizontal position independently of the main frame, whatever may have been the height at which it was set, by turning the machine upon the drive-wheel axle. This adjustment, however, constitutes no part of my present claim under this patent.

The header attachment thus constructed is provided with a sustaining chain or rod, K, which extends from a bracket, $s$, of the grain-wheel side frame to a hinged loop, $t$, at the top of the apron-spout. It also is provided with an arching oblique-set bent bar or back beam, L, with its ends flattened and perforated, and one screwed to the top of the grain-wheel beam and the other left loose to be screwed to the top of the drive-wheel frame, as represented. It is further provided with two horizontal bars, $u$, on the under side of its hinged apron-spout, said arms extending back from the horizontal portion of the said spout to a position under the back beam, and up from them two chains, $v\ v$, extend and attach to the back beam, so as to sustain through the beam the weight of the apron-spout.

In order to drive the two aprons between which the grain ascends the steep incline plane formed by the upper portion of the apron-spout, the upper pulley-shafts are geared with a cross-belt, N, and in order to set the aprons in motion, a grooved pulley, $o$, with belt $w$, is provided on the pulley-shaft of the first apron.

The reaper-frame Q, to which this header attachment is connected, is provided with a grooved eccentric, P, for driving the cutter-bar, and to receive round its circumference the belt $w$. It also is provided with a bent bracket, $y$, near its rear end, to support the conductor at its joint, and with a perforated adjusting-support, $z$, for holding the apron-spout at any point it may be adjusted on its hinges. There are also two friction-pulleys, 2 2, arranged in a bearing-iron at the front of the drive-wheel R frame Q, so that the belt $w$ may work properly upon the eccentric P. To a reaper-frame thus provided, the header is attached by fastening the loose end of the back beam, as shown at 3, and inserting a screw through the perforated support and into the apron-spout, as shown at 4, and fastening the finger-bar to the top or under side of the short sill, and otherwise arranging the parts as represented in the drawings.

By my mode of constructing and applying the detached header the sickle is elevated sufficiently high without lengthening the distance from the axle of the driving-wheel R to the sickle, to which there are many objections, it throwing too much weight forward and making it difficult to manage. The aprons and spout can be adjusted so as to always stand or lie level, whether cutting high or low, the chains and hinges and adjusting-support admitting of this. The grain is prevented from scattering or rolling back in its ascent, the two aprons confining and elevating it most effectually. The aprons and inclined portion of the spout are brought directly, or nearly so, over the driving-wheel, instead of in front thereof. This is important, as it places the weight so near the axis of the drive-wheel as to nearly balance it on the same, and thus raises and lowers easily, whereas if the spout were placed in front of the drive-wheel it could not be adjusted by the driver so readily. The aprons are driven by a belt from the pitman crank-wheel or eccentric of the cutter-bar mover, and thus much gearing obviated; and, finally, the jointed conductor lays the stubble and insures a more uniform deposit in gavels of the grain upon the same.

What I claim as my invention, and desire to secure by Letters Patent, is—

1. The header attachment for harvesters, combining the several elements described herein and represented in the drawings, or the equivalent thereof, for use in connection with the main frame Q (or its equivalent) of a reaper or mower by being attached to the short sill of said frame, substantially as described.

2. In a detached-header organization, substantially as described, the construction of the horizontal and inclined portions A A' of the spout in one piece, in combination with the supporting of the horizontal portion by hinges on the finger-beam, and by chains or rods on a curved back beam, and with the supporting and adjusting of both portions together by means of an adjusting-bracket of the main frame Q of a harvester, substantially as and for the purpose set forth.

3. In connection with an adjustable or hinged spout, A A', of a detached header, the arrangement of the adjusting supporting-brace $z$, substantially as and for the purpose described.

4. Leaning the stubble of the field all one way for the deposit of the grain upon it by means of the hinged or swinging portion E, or its equivalent, of the conductor D, substantially as described.

5. The combination of the back beam, L, constructed substantially as described, with the sustaining rod or chain $v$, bracket $y$, support $z$, and grain-side beam $m$, and with the main frame Q and spout A A′, and conductor D E, substantially in the manner and for the purpose described.

6. Providing the main frame Q with the brackets $y$, support $z$, friction-rollers 2 2, and the grooved eccentric P to receive a header attachment, substantially as set forth.

7. The combination of the independently-adjustable finger-beam H and divider $l$ with an independently-adjustable spout, A A′, aprons B B′, and conductor D E, substantially as and for the purpose described.

GEO. ESTERLY.

Witnesses:
G. W. ESTERLY,
THEODORE HEMPEL.